United States Patent
Roche et al.

(10) Patent No.: US 6,805,949 B1
(45) Date of Patent: Oct. 19, 2004

(54) METHOD FOR ENHANCING ADHESION OF METAL PARTICLES TO CERAMIC MODELS

(75) Inventors: Allen Dennis Roche, Saline, MI (US); John Michael Nicholson, Wayne, MI (US); Richard L. Allor, Livonia, MI (US); David Warren Worthey, Loganville, GA (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/249,233

(22) Filed: Mar. 25, 2003

(51) Int. Cl.[7] .............................................. B32B 5/24
(52) U.S. Cl. ............................ 428/311.11; 428/304.4; 216/7; 216/11; 216/96; 427/133; 427/180; 427/181; 427/206; 427/307; 427/309; 427/331; 427/421; 427/427; 427/446
(58) Field of Search ..................... 428/304.4, 311.1, 428/688, 698, 364, 311.11, 702; 216/7, 11, 96; 427/133, 180, 181, 206, 307, 309, 331, 421, 427, 446

(56) References Cited

U.S. PATENT DOCUMENTS

| | | | |
|---|---|---|---|
| 4,511,614 A | * 4/1985 | Greeson et al. | 427/309 |
| 5,058,799 A | * 10/1991 | Zsamboky | 216/13 |
| 5,069,937 A | * 12/1991 | Wall | 427/455 |
| 5,143,592 A | * 9/1992 | Toro | 427/307 |
| 5,169,578 A | * 12/1992 | Fukao | 264/637 |
| 5,337,631 A | 8/1994 | Singer et al. | |
| 5,702,584 A | * 12/1997 | Goenka et al. | 216/33 |
| 5,718,863 A | 2/1998 | McHugh et al. | |
| 5,952,056 A | 9/1999 | Jordan et al. | |
| 6,074,194 A | 6/2000 | McHugh | |
| 6,155,330 A | 12/2000 | Kinane et al. | |
| 6,257,309 B1 | 7/2001 | Kinane et al. | |
| 6,527,038 B1 | * 3/2003 | Jordan et al. | 164/46 |

FOREIGN PATENT DOCUMENTS

| | | | | |
|---|---|---|---|---|
| GB | 0 896 959 A | * | 8/1998 | C04B/35/593 |
| JP | 07-161511 | * | 6/1995 | H01C/17/06 |

* cited by examiner

Primary Examiner—Archene Turner
(74) Attorney, Agent, or Firm—Brooks Kushman P.C.; Damian Porcari

(57) ABSTRACT

One method of the present invention relates to a method for enhancing adhesion of spraying metal to a ceramic model. The method is comprised of providing the ceramic model having a spray surface, and modifying at least a portion of the spray surface if the ceramic model to enhance adhesion of spray metal to the spray surface.

11 Claims, 1 Drawing Sheet

METHOD FOR ENHANCING ADHESION OF METAL PARTICLES TO CERAMIC MODELS

BACKGROUND OF INVENTION

1. Field of the Invention

At least one aspect of this invention relates to a method for enhancing adhesion of metal particles to ceramic models and, more particularly, a method for enhancing adhesion of sprayed metal to ceramic model spray surfaces using spray forming techniques.

2. Background Art

Spray forming techniques for producing steel prototype tooling, such as dies and molds, are commonly utilized in the automotive industry as well as other industries. One typical spray forming technique includes the following steps: (1) casting a ceramic model containing a spray surface about a mold containing a master pattern of the tool to be produced; (2) spraying metal particles onto the spray surface so that the metal particles adhere; (3) allowing the sprayed metal particles to cool thereby forming a metal deposit having the general shape characteristics of the master pattern; and (4) separating the metal deposit from the ceramic model.

During the spraying step, the metallic particles may not adhere sufficiently to the ceramic model. In some instances, the metal deposit may separate from the spray surface during spraying thereby causing the edges of the metal deposit to curl upward and/or the formation of air pockets between the metal deposit and the spray surface. Consequently, the metal deposit may not resemble the general shape characteristics of the master pattern. In some extreme cases, the metal deposit must be scrapped due to the severity of separation between the metal deposit and the ceramic model.

Freeze-cast ceramics have been used as ceramic models based in part on their superior adhesion characteristics. One typical freeze-casting process includes the following steps: (1) pouring a slurry of silica sol and filler material into the mold containing the master pattern, (2) lowering the temperature of the mold to freeze the slurry and form a freeze-cast ceramic containing the spray surface, (3) extracting the freeze-cast ceramic from the mold, and (4) sintering the freeze-cast ceramic.

The adhesion-promoting characteristic typical of freeze-cast ceramics can be attributed to a topology produced at the surface of the substrate that accepts the metal particles and forms a strong adhesion bond. The topology, otherwise referred to as a morphology, is produced due to the presence of silica sol flakes in the ceramic slurry during the freeze-casting process. Depending on the process conditions, i.e., thermal gradient in the slurry, freezing rate, concentrations of slurry components, etc., the flakes can form in various shapes, including grains and dendrites. The silica sol flake patterns produced by sintering leave behind fissures in the surface of the ceramic models. FIG. 1 provides a schematic illustration of an exploded side view of the surface region of a ceramic model with fissures. The sprayed metal particles 12 bleed into the fissures 14, causing tight adherence of the metal deposit to the ceramic model.

The adhesion-promoting characteristic of freeze-cast ceramics is highly desirable for other ceramic models, i.e. ceramic models that do not require freezing. Ceramic models that do not require freezing are generally less expensive to produce than freeze-cast ceramics. Imparting the adhesion-promoting characteristic on non freeze-cast ceramic models would allow the substitution of non freeze-cast ceramic models for freeze-cast ceramics with attendant labor and time savings while sustaining the quality of the metal deposit. It is also desirable to provide a method of further intensifying the adhesion promoting characteristics of freeze-cast substrates.

SUMMARY OF INVENTION

At least one aspect of the present invention is related to methods for enhancing adhesion of metal particles to ceramic models.

One preferred method embodiment includes providing a ceramic model having a spray surface and modifying at least a portion of the spray surface of the ceramic model to enhance the adhesion of sprayed metal to the spray surface.

The providing step can comprise preparing a ceramic mixture, pouring the ceramic mixture into a mold, and heating the ceramic mixture to provide the ceramic model. The ceramic mixture can include a fibrous material. The modifying step can include removing the fibrous material contained on at least the portion of the spray surface by heating to provide a plurality of fissures. The fibrous material can be polymeric fiber or metal fiber. If the fibrous material is a metal fiber, the modifying step can include drying the ceramic mixture to provide a plurality of protrusions on the spray surface. These protrusions enhance adhesion of sprayed metal to the spray surface.

Alternatively, the modifying step can include applying a spray of liquid nitrogen to at least the portion of the spray surface to form ice crystals and removing the ice crystals contained on at least the portion of the spray surface by sintering to provide a plurality of fissures. These fissures enhance the adhesion of sprayed metal to the spray surface.

In accord with another preferred embodiment, a ceramic model for accepting sprayed metal particles is disclosed which comprises a ceramic model having a spray surface, wherein at least a portion of the spray surface of the ceramic model is modified to enhance adhesion of sprayed metal to the spray surface. The spray surface can be modified by applying an acid to the spray surface to roughen the spray surface to increase the adhesion of sprayed metal.

Once the ceramic model spray surface with enhanced adhesion characteristics is formed, metal particles can be sprayed onto the spray surface using spray forming techniques. Examples of suitable spray forming techniques include, but are not limited to, cold spraying, flame powder, flame wire, arc spraying, plasma spraying, high energy plasma spraying, vacuum plasma spraying, detonation, and high velocity oxyfuel.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

DETAILED DESCRIPTION

Figure 1:
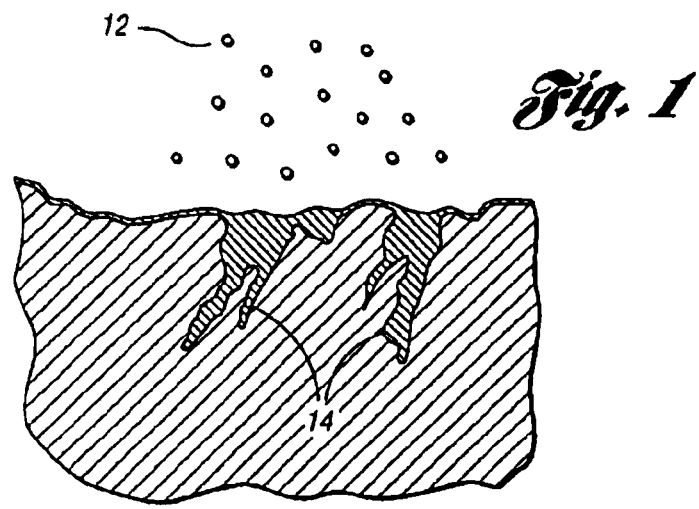
FIG. 1 provides a schematic illustration of an exploded side view of the surface region of a ceramic model with fissures.

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

One aspect of the present invention provides a method for enhancing adhesion of sprayed metal. The method generally comprises providing a ceramic model having a spray surface and modifying at least a portion of the spray surface of the ceramic model to enhance the adhesion of sprayed metal to the spray surface.

Examples of suitable ceramics for use as the ceramic model include, but are not limited to, technical ceramics (otherwise referred to as advanced, high-tech, high-performance, engineering, or fine ceramics), and castable ceramics.

Technical ceramics commonly have a glassy component and a highly engineered micro structure. Examples of technical ceramics suitable for use in accord with the present invention include, but are not limited to, piezoelectric ceramics, package ceramics, magnetic ceramics, and optical ceramics.

Castable ceramics are commonly produced with natural raw materials, such as clay, silica, and feldspar. Examples of castable ceramics suitable for use in accord with the present invention include whitewares, refractories, and freeze-cast ceramics. Whitewares usually include a glassy component and are commonly used to produce items such as toilets, dental implants, and spark plug insulators. Refractories usually have a high melting point and maintain structural integrity at high temperatures. Refractories are commonly used as furnace and kiln linings. Freeze-cast ceramics are commonly used in the production of complex shapes as well as substrates in spray forming processes.

Whitewares and refractories can be produced through a slip-casting process. One typical slip-casting process includes (1) mixing clay powder, dispersing agent, and water to form a slip, (2) pouring the slip into a filling mold, (3) draining the slip through a drain valve in the filling mold to form a cast around the inner surface of the filling mold, (4) drying the cast, (5) plugging and separating the cast to form a plug, and (6) drying the plug to form the ceramic model. Other processes suitable for producing whitewares and refractories include, but are not limited to, pressing and extrusion.

One example of a castable ceramic that can be used in accordance with the present invention is freeze-cast ceramics, which can be produced by a freeze-casting process. One typical freeze-casting process includes the following steps: (1) pouring a slurry into a mold containing a master pattern, (2) lowering the temperature of the slurry to freeze the slurry and form the freeze-cast ceramic, (3) extracting the freeze-cast ceramic from the mold, (4) thawing the freeze-cast ceramic, and (5) drying the freeze-cast ceramic during the firing cycle.

The ceramic model contains a spray surface for receiving sprayed metal particles. However, technical ceramics, whitewares, and refractories are generally unsuitable for receiving sprayed metallic particles. The sprayed metal usually does not stick to the surface of these ceramics, causing warping, shrinkage, and distortion.

According to a preferred method of the present invention, technical ceramics, whitewares, and refractories, as well as other ceramics that are generally unsuitable for receiving sprayed metal, can be modified to enhance the adhesion of sprayed metal to the spray surface. Additionally, the preferred method can be utilized to further increase the adhesion characteristics of freeze-cast ceramics.

The adhesion can be enhanced so that, among other useful advantages, the ceramic model can be used for producing steel prototype tooling using spray forming techniques. Moreover, the combination of sprayed metal and ceramic can be used as metal-ceramic composites. Metal-ceramic composites can be used as sand core tools, injection tools, ceramic tiles, and foundry tools. Moreover, metal-ceramic composites can be used as thermally stable supports for electric vehicle power inverters, among other uses.

According to a preferred embodiment, a fibrous material can be utilized as a surface modifier. As a non-limiting example, polymeric fibers can be used as a fibrous material. Examples of polymeric fibers that can be used in accord with the present invention include polypropylene, polyethylene, nylon, polyester, polyurethane, cellulose, polyacrylonitrile, kevlar, nomex, etc. Preferably, polypropylene and polyethylene are utilized due to their widespread availability and relatively low cost.

The polymeric fiber can be added to the ceramic mixture (i.e., slip or slurry). The concentration of polymeric fiber that can be added varies based on application and can be in the range of between about 1% by weight to about 10% by weight, preferably about 3% by weight to about 7% by weight, and most preferably 5% by weight. During subsequent steps in the ceramic forming process, the polymeric fibers are cast into the ceramic model which includes the spray surface. The polymeric fibers about the spray surface are burned off during the heating of the ceramic, leaving behind a plurality of fissures in the spray surface. The plurality of fissures enhance the adherence between sprayed metal and the spray pattern surface by allowing the sprayed metal to bleed into the fissures.

As another non-limiting example, metal and carbon fibers can be used in accord with the present invention. Examples of metals suitable for use as metal fibers include, but are not limited to, iron, stainless steel, nickel, and alloys therefrom. Carbon fibers refer to a group of fibrous materials comprising essentially elemental carbon, including graphite. Carbon fibers can be prepared by pyrolysis of organic fibers.

The metal or carbon fiber can be added to the ceramic mixture (i.e., slip or slurry).

The concentration of metal or carbon fiber that can be added varies based on application and can be in the range of between about 1% by weight to about 10% by weight, preferably about 3% by weight to about 7% by weight, and most preferably 5% by weight. During subsequent steps in the ceramic forming process, the metal or carbon fibers are cast into the ceramic model which includes the spray surface. Many of the metal or carbon fibers extend beyond the spray surface to form a network of protrusions on the spray surface. These protrusions enhance the adhesion of sprayed metal to the spray surface.

The aspect ratio of the fibrous material can be in the range of about 30:1 to about 60:1, preferably about 40:1 to about 55:1, and most preferably 50:1. It should be understood that aspect ratio can be modified depending on a variety of factors, including the composition of the fibrous material and the ceramic.

Another preferred surface modifier is an acid which is applied to the spray surface. It has been discovered that sprayed metal adhesion is promoted when the acid wash attacks the grain boundaries of the spray surface.

Examples of acids suitable for the acid wash application include phosphoric acid, acetic acid, and muriatic acid in either liquid or gel state. The weight percentage of the acid in water can be in the range of about 0.5% to about 20%, preferably about 10% to about 18%, and most preferably 15%. The acid can be applied to the spray surface through a variety of methods, including wiping, dipping, and vapor depositing.

Another preferred surface modifier, which applies to castable ceramics, and most preferably freeze-cast ceramics, is the formation of ice crystals on the spray surface. After removing the freeze-cast substrate from the mold and before sintering, the spray surface can be subjected to a spray of liquid nitrogen or a coating of chopped dry ice to form ice crystals on the spray surface. The freeze-cast ceramic can then be sintering to drive off the ice crystals, leaving behind a network of fissures.

After providing a spray surface with suitable adhesion characteristics, sprayed metal can be deposited on the spray pattern surface through spray forming. It should be understood that spray forming can refer to any technique used to deposit metal particles upon the spray pattern surface. Spray forming techniques that can be used in accord with the present invention include, but are not limited to spray-rolling, spray-forging, centrifugal spray-casting, spray-casting, spray-pining, splat-coating, particle composite deposition, roller atomizing, modified arc spray, and modified plasma spraying.

Thermal spray guns are typically used to deliver sprayed metal onto the ceramic model using thermal spraying techniques. The thermal spray gun can be of the oxy-acetylene flame type in which a wire or powder metal is fed thereinto, a plasma into which powder metal is fed, or preferably one or two wire arc type, in which the tip of the wires is fed into the arc. Cold spraying guns capable of impact fusion could be used in place of thermal spray guns to spray metallic particles onto the freeze-cast substrate.

In a two wire arc spray gun, an electric arc is generated in a zone between two consumable wire electrodes. As the electrodes melt, the arc is maintained by continuously feeding the electrodes into the arc zone. The metal at the electrode tips is atomized by a blast of generally cold compressed gas. The atomized metal is then propelled by the gas jet to a substrate forming a deposit thereon.

In a single wire arc apparatus, a single wire is fed either through the central axis of the torch or is fed at an acute angle into a plasma stream that is generated internally within the torch. The single wire acts as a consumable electrode that is fed into the arc chamber. The arc is established between the cathode of the plasma torch and the single wire as an anode, thereby melting the tip of the wire. Gas is fed into the arc chamber, coaxially to the cathode, where it is expanded by the electric arc to cause a highly heated gas stream (carrying metal droplets from the electrode tip) to flow through the nozzle. A further higher temperature gas flow may be used to shroud or surround the spray of molten metal so that droplets are subjected to further atomization and acceleration.

Yet still other wire arc torch guns may be utilized that use a transferred-arc plasma whereby an initial arc is struck between a cathode and a nozzle surrounding the cathode. The plasma created from such arc is transferred to a secondary anode (outside the gun nozzle) in the form of a single or double wire feedstock causing melting of the tip of such wire feedstock.

After completing the spraying step, the ceramic model can be removed from the metal deposit, for example, if the metal deposit is to be used as a metal prototype tool. Preferably, pneumatic chiseling is used to remove big pieces of the ceramic model. For smaller pieces adhering to the surface of the metal deposit, bead blasting is the preferred method of removal. Example of bead blasting methods include sand blasting, rotary water jet, and metal shot.

Having generally described the present invention, a further understanding can be obtained by reference to certain examples which are provided herein for purposes of illustration only and are not intended to be limiting unless otherwise specified.

EXAMPLE 1

Example 1 discloses a method of forming ice crystals on the spray surface of a castable ceramic to enhance surface adhesion. It should be understood that other ceramics, i.e., technical ceramics and other castables, can be used with the method of forming ice crystals to enhance surface adhesion in accordance with Example 1. The slurry used to produce the castable ceramic is comprised of the following:

TABLE 1

| Component | Volume % |
| --- | --- |
| Ceramic | 89.8% |
| Water | 10.2% |
| Wetting Agent | <0.1% |

The preferred ceramic is TG Fine, available from Ceradyne Thermo Materials of Scottsdale, Georgia. The preferred wetting agent is Cascade Rinse Aid, available from Proctor and Gamble of Cincinnati, Ohio.

The slurry is then poured into and sets in a 12'×12'×2' mold constructed of Renboard 476. After about 19 hours, the slurry is sufficiently set to be removed from the mold. A release agent, preferably Replicast spray release agent available from Cotronics Corp. of Brooklyn, N.Y., can be used to ease removal of the castable ceramic.

The spray surface of the castable ceramic is then covered with crushed dry ice for about 45 minutes. The spray surface is then uncovered and allowed to air dry.

EXAMPLE 2

Example 2 discloses a method of forming ice crystals on the spray surface of a castable ceramic to enhance surface adhesion. It should be understood that other ceramics, i.e., technical ceramics and other castables, can be used with the method of forming ice crystals to enhance surface adhesion in accordance with Example 2. The slurry used to produce the castable ceramic is comprised of the following:

TABLE 2

| Component | Volume % |
|---|---|
| Ceramic | 89.8% |
| Water | 10.2% |
| Wetting Agent | <0.1% |

The preferred ceramic is TG Fine and the preferred wetting agent is Cascade Rinse Aid.

The slurry is poured into a mold of a 5.4 liter lower crank case. After about 18 hours, the slurry is sufficiently set to be removed from the mold. Preferably, Replicast spray release agent can be used to ease removal of the castable ceramic from the mold.

The spray surface of the castable ceramic in wet form is then covered with shredded dry ice for about 1 hour. The spray surface is then uncovered and allowed to air dry.

The adhesion characteristics of the spray surface of Example 2 relative to an untreated spray surface are enhanced as a result of the shredded dry ice treatment.

EXAMPLE 3

Example 3 discloses a method of applying an acid to the spray surface of a castable ceramic to enhance surface adhesion. It should be understood that other ceramics, i.e., technical ceramics and other castables, can be used with the method of applying an acid to enhance surface adhesion in accordance with Example 3. The slurry used to produce the castable ceramic is comprised of the following: ceramic material (preferably TG Fine), water, and wetting agent (preferably Cascade Rinse Aid).

The slurry is then poured into and sets in a 5.4 liter lower crank case mold. After about 18 hours, the slurry is sufficiently set to be removed from the mold. Preferably, Replicast spray release agent can be used to facilitate easy removal of the castable ceramic from the mold. The spray surface is then treated with vinegar prior to the firing stage.

The adhesion characteristics of the spray surface of Example 3 relative to an untreated spray surface are enhanced as a result of the vinegar treatment.

EXAMPLE 4

Example 4 discloses a method of forming ice crystals on the spray surface of a freeze-cast ceramic to enhance surface adhesion. It should be understood that other ceramics, i.e., technical ceramics and other castables, can be used with the method of forming ice crystals to enhance surface adhesion in accordance with Example 4.

The slurry used to produce the freeze-cast ceramic is comprised of the following: a ceramic powder (preferably 100 mesh $Al_2O_3$), a collodial silica (preferably LUDOX HS-40, available from DuPont Canada Inc. of Mississauga, Ontario) and a wetting agent (preferably Cascade Rinse Aid). The slurry is poured into and sets in a 5.4 liter lower crank case mold. After about 18 hours of chilling the slurry, the slurry is sufficiently set and can be removed from the mold. Preferably, Replicast spray release agent can be used to facilitate easy removal of the freeze-cast ceramic from the mold.

The spray surface of the freeze-cast ceramic is then flooded with liquid nitrogen spray for about 10 minutes. After treatment with the liquid nitrogen spray, the ceramic is returned to the freezer for an additional 24 hours.

A spray adhesion test was performed on the freeze-cast ceramic and the spray surface appeared to be very dendridic.

EXAMPLE 5

A fibrous material is added to a slurry used to produce a castable ceramic to enhance the surface adhesion. The slurry preferably includes a castable TGIF ceramic material available from Ceradyne. The fibrous material is preferably polypropylene fibers.

The ceramic enhanced with the fibrous material was tested for adhesion and warp under a variety of preheating and gun amperage conditions. The range of possible adhesion values is about 1 to about 5 (with 5 representing maximum adhesion) and the range of possible warp values is about −0.5 inches to about 0.5 inches. The results of these tests are found in Table 3.

TABLE 3

| Condition | PREHEAT (° C.) | GUN AMPERAGE (amperes) | ADHESION (scale) | WARP (inch) |
|---|---|---|---|---|
| 1 | 100 | 200 | 2 | −0.0200 |
| 2 | 25 | 200 | ~2 | ~−0.011 |
| 3 | 200 | 250 | 5 | 0.0686 |
| 4 | 25 | 150 | 4 | −0.1474 |
| 5 | 100 | 250 | 4 | 0.0632 |
| 6 | 200 | 200 | 1 | 0.0059 |
| 7 | 100 | 150 | 4 | −0.1373 |
| 8 | 200 | 150 | 2 | −0.1487 |
| 9 | 200 | 150 | ~2 | ~−0.14 |
| 10 | 25 | 250 | 4 | 0.0344 |
| 11 | 200 | 250 | ~5 | −0.06 |

Figure 2:
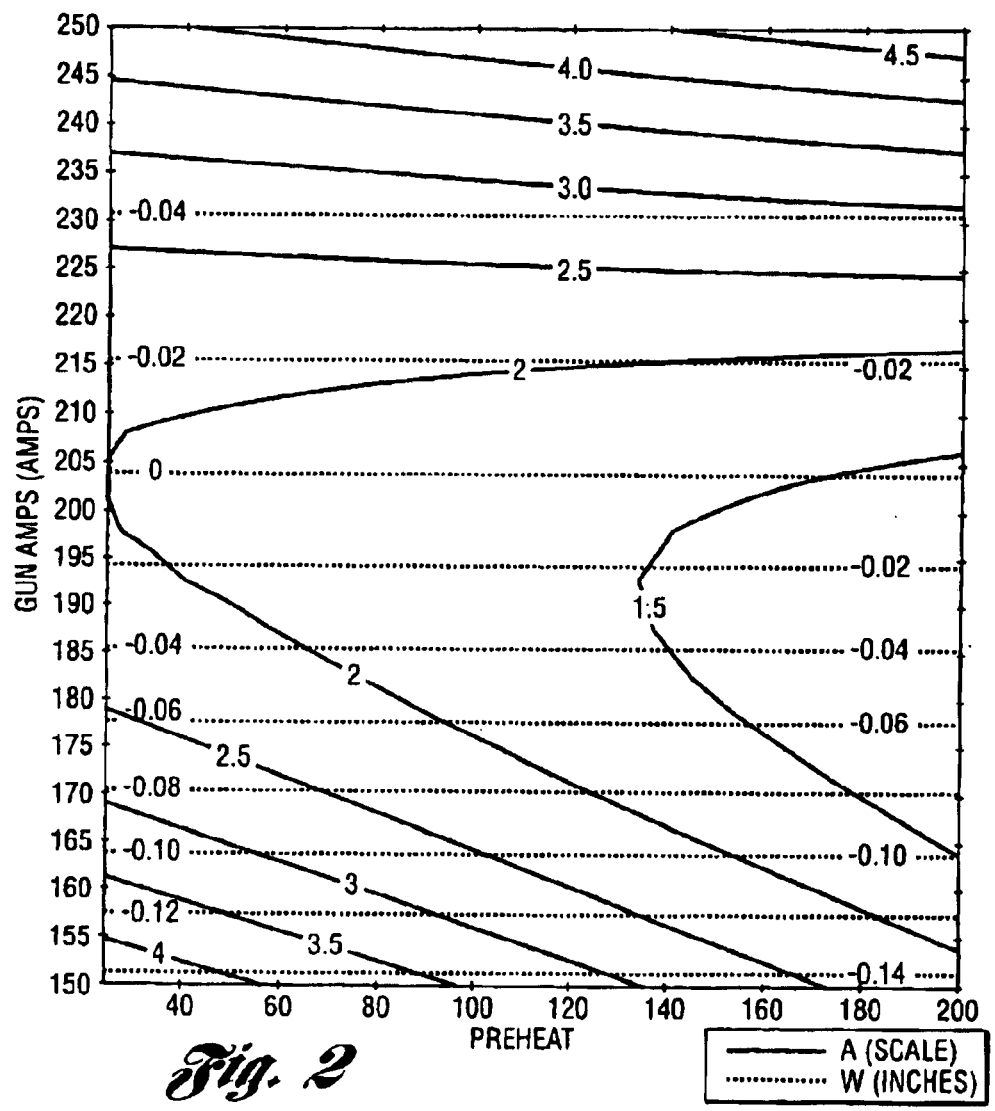
FIG. 2 is a graph illustrating the relationship between adhesion (A) and warp (W) based on gun amperage and preheat temperature for an enhanced adhesion surface in accordance with a preferred embodiment of the present invention.

Both gun amperage and preheating have an effect on warp and adhesion. At minimum warp conditions (gun amperage equals about 204 amperes), highest adhesion can be obtained with no preheat. However, adhesion under these conditions is only about 2. Higher adhesion values are possible with other gun amperage and preheat temperature combinations, but warp increases. FIG. 2 is a graph illustrating the relationship between adhesion (A) and warp (W) based on gun amperage and preheat temperature for the ceramic enhanced with fibrous material in accordance with example 5.

While the best mode for carrying out the invention has been described in detail, those familiar with the art to which this invention relates will recognize various alternative designs and embodiments for practicing the invention as defined by the following claims.

What is claimed is:

1. A method for enhancing adhesion of sprayed metal, the method comprising:
   preparing a ceramic mixture including a fibrous material;
   pouring the ceramic mixture into a mold;
   heating the ceramic mixture to provide a ceramic model having a spray surface; and
   modifying at least a portion of the spray surface of the ceramic model to enhance the adhesion of sprayed metal to the spray surface by removing the fibrous material contained on at least the portion of the spray surface by heating to provide a plurality of fissures.

2. The method of claim 1 wherein the fibrous material is a polymeric fiber.

3. A method for enhancing adhesion of sprayed metal, the method comprising:
   preparing a ceramic mixture including a metal fiber;
   pouring the ceramic mixture into a mold;
   heating the ceramic mixture to provide a ceramic model having a spray surface; and modifying at least a portion of the spray surface of the ceramic model to enhance the adhesion of sprayed metal to the spray surface.

4. The method of claim 3 wherein the modifying step is comprised of drying the ceramic mixture to provide a plurality of protrusions on the spray surface.

5. The method of claim 3 wherein the fibrous material is comprised of carbon fibers.

6. A method for enhancing adhesion of sprayed metal, the method comprising:

preparing a ceramic mixture;

pouring the ceramic mixture into a mold;

heating the ceramic mixture to provide a ceramic model having a spray surface, the ceramic model being comprised of a freeze-cast substrate; and modifying at least a portion of the spray surface of the ceramic model to enhance the adhesion of sprayed metal to the spray surface by applying an acid to the spray surface to roughen the spray surface.

7. The method of claim 6 wherein the acid is selected from the group consisting of phosphoric acid, acetic acid, and muriatic acid.

8. A method for enhancing adhesion of sprayed metal, the method comprising:

providing a ceramic model having a spray surface; and modifying at least a portion of the spray surface of the ceramic model to enhance the adhesion of sprayed metal to the spray surface by applying an ice crystal forming agent to at least the portion of the spray surface to form ice crystals and removing the ice crystals contained on at least the portion of the spray surface by sintering to provide a plurality of fissures.

9. The method of claim 8 wherein the ice crystal forming agent is a coating of dry ice.

10. The method of claim 8 wherein the ice crystal forming agent is a spray of liquid nitrogen.

11. A ceramic model for accepting sprayed metal particles, the ceramic model comprising:

a ceramic model having a spray surface wherein at least a portion of the spray surface of the ceramic model is modified to enhance the adhesion of sprayed metal to the spray surface, wherein the ceramic model is provided by preparing a ceramic mixture, pouring the ceramic mixture into a mold, and heating the ceramic mixture and the ceramic mixture includes a fibrous material and the spray surface is modified by removing the fibrous material contained on at least the portion of the spray surface by heating to provide a plurality of fissures.

* * * * *